(12) United States Patent
Yap (10) Patent No.: US 8,894,084 B1
(45) Date of Patent: Nov. 25, 2014

(54) COMPACT FOLDING BICYCLE

(71) Applicant: Fook Fah Yap, Singapore (SG)

(72) Inventor: Fook Fah Yap, Singapore (SG)

( * ) Notice: Subject to any disclaimer, the term of this patent is extended or adjusted under 35 U.S.C. 154(b) by 0 days.

(21) Appl. No.: 13/956,611

(22) Filed: Aug. 1, 2013

(51) Int. Cl.
*B62K 15/00* (2006.01)

(52) U.S. Cl.
CPC ................................. *B62K 15/008* (2013.01)
USPC .......................................... 280/278; 280/287

(58) Field of Classification Search
CPC ..... B62K 15/006; B62K 15/008; B62K 15/00
USPC ................................. 280/278, 287
See application file for complete search history.

(56) References Cited

U.S. PATENT DOCUMENTS

| | | | |
|---|---|---|---|
| 4,718,688 A | | 1/1988 | Sanders |
| 4,895,386 A | | 1/1990 | Hellestam et al. |
| 5,398,955 A | * | 3/1995 | Yeh ............... 280/287 |
| 5,836,602 A | | 11/1998 | Wang |
| 6,135,668 A | * | 10/2000 | Lin ............... 403/322.4 |
| 6,336,649 B1 | * | 1/2002 | Lin ............... 280/278 |
| 6,364,335 B1 | | 4/2002 | Mombelli |
| 6,641,159 B1 | * | 11/2003 | Fan ............... 280/278 |
| 6,799,771 B2 | | 10/2004 | Bigot |
| 6,986,522 B2 | | 1/2006 | Sinclair et al. |
| 7,591,473 B2 | * | 9/2009 | Tak-Wei Hon et al. ....... 280/278 |
| 7,651,109 B2 | * | 1/2010 | Tong ............... 280/278 |
| 8,162,345 B1 | * | 4/2012 | Szu-Yao ............... 280/287 |
| 8,205,902 B2 | * | 6/2012 | Uimonen et al. ............. 280/278 |
| 8,430,414 B1 | | 4/2013 | Yap |
| 2007/0013162 A1 | | 1/2007 | Whyte |
| 2007/0210556 A1 | | 9/2007 | Hon et al. |

FOREIGN PATENT DOCUMENTS

| | | |
|---|---|---|
| EP | 0026800 B1 | 5/1984 |
| EP | 0505598 A1 | 9/1992 |
| EP | 1600368 A2 | 4/2005 |
| EP | 2492175 A1 | 2/2011 |
| WO | 8605155 A1 | 9/1986 |
| WO | 2004041631 A1 | 5/2004 |

OTHER PUBLICATIONS

Jango bikes website: www.jangobikes.com, Apr. 22, 2014.
Mike Hanlon, GizMag website: www.gizmag.com/myway-compact-smallest-fold-up-electric-scooter/22475/, May 9, 2012.
DesignBuzz, Design Buzz Website: www.designbuzz.com/7-foldable-scooters-smart-efforless-transportation/ , Oct. 27, 2011.
StigoBike website: stigobike.com/ , Apr. 3, 2014.
Antonio Pasolini, GizMag website: www.gizmag.com/jac-electric-scooter/25928/ , Jan. 23, 2013.
Greenmuze, GreenMuze website: www.greemuze.com/climate/travel/1799-urban-scooter-fo-adults-.html/, Nov. 10, 2009.
Chris Burns, Aug. 13, 2013: 'Fold Your Saddle', Yanko Design—Form Beyond Function.
Birdy Bike Website, Jul. 24, 2013: http://www.birdybike.com.
Bickerton Website, Jul. 24, 2013: http://www.bickertonportables.co.uk.
Dahon Bikes Website, May 8, 2013: http://dahon.com/mainnav/home.html.
Pacific Cycles Website, May 8, 2013: http://www.pacific-cycles.com.

* cited by examiner

*Primary Examiner* — Kevin Hurley
*Assistant Examiner* — Michael Stabley
(74) *Attorney, Agent, or Firm* — MP Patents, LLC (57) ABSTRACT

A vehicle having a front wheel, a main frame member and a rear wheel assembly including a rear wheel is configured for conversion between expanded and folded arrangements. A hinge coupling enables relative pivoting of forward and rearward portions of the main frame member about a main frame pivot axis extending at an acute angle relative to a rear vertical transverse plane and at an acute angle relative to a horizontal plane. A rear wheel assembly hinge is configured to allow the rear wheel assembly to pivot relative to the main frame member within a vertical plane coincident with the rear vertical longitudinal plane. The front vertical longitudinal plane and the rear vertical longitudinal plane are spaced apart and approximately parallel, in the folded arrangement.

20 Claims, 10 Drawing Sheets

COMPACT FOLDING BICYCLE

BACKGROUND

The present disclosure relates generally to wheeled vehicles. More particularly, the present disclosure is related to embodiments of an apparatus providing wheeled vehicles such as bicycles capable of assuming a reduced size for transport. Currently, most vehicles are not capable of quickly folding into a small footprint.

SUMMARY

A vehicle configured for conversion between expanded and folded arrangements, includes a front wheel having a circumference defining a front vertical longitudinal plane and an axle defining a front vertical transverse plane orthogonal to the front vertical longitudinal plane; a rear wheel having a circumference defining a rear vertical longitudinal plane and an axle defining a rear vertical transverse plane orthogonal to the rear vertical longitudinal plane; a main frame member having forward and rearward portions extending between the front wheel and the rear wheel and including, for receiving a steering tube, a head tube formed at a distal end of the forward portion and, for receiving a seat post, a seat tube formed at a distal end of the rearward portion; and a hinge coupling enabling relative pivoting of the forward and rearward portions about a main frame pivot axis extending at an acute angle relative to the rear vertical transverse plane and at an acute angle relative to a horizontal plane orthogonal to both the rear vertical longitudinal and rear vertical transverse planes; and a rear wheel assembly hinge configured to allow the rear wheel to pivot relative to the main frame member in a vertical plane coincident with the rear vertical longitudinal plane.

Longitudinal axes of the forward and rearward portions are coincident in the expanded arrangement and non-coincident in the folded arrangement and wherein the front vertical longitudinal plane and the rear vertical longitudinal plane are spaced apart and approximately parallel, in the folded arrangement.

DETAILED DESCRIPTION

Non-folding bicycles are generally too large to conveniently fit on buses and trains. Known folding bicycles occupy relatively large footprints in their folded configuration due to a number of factors. A common folding bicycle design comprises a single hinge joint on its frame. With this design, a front half of a bicycle may be folded laterally to meet a rear half, effectively reducing the length of the bicycle only by approximately one half. In addition to having a relatively long folded size, such folded arrangements place two wheels side-by-side so that the minimum footprint width is equal to or greater than the sum of the length of the wheel axles. Further, the plane of the front wheel is inclined at an angle relative to the plane of the rear wheel contributing to an additional increase in footprint width.

In order to reduce the length of the folded bicycle to less than half of its expanded length, a second hinge on a frame can be used. This enables reducing the length to approximately one-third when folded. In a common two-hinge folding bicycle design, a second hinge joint is located proximal to the bottom of a seat tube between a rear triangle and a main frame. The second hinge axis is oriented parallel to a wheel axle and transverse to the first hinge. Pivoting the front wheel assembly about the first hinge through approximately 180 degrees brings the front end of the bicycle to rest alongside the central part of the frame. Pivoting the rear wheel assembly longitudinally through approximately 180 degrees about the second hinge brings the rear end of the bicycle to rest below the frame.

The predominantly vertical orientation of first frame hinge axis of known designs allows forces during normal riding to apply bending stress on the main frame hinge contributing to loosening. A strong clamping means must be used to keep the hinges closed. Over time, the hinge may develop joint play due to the high bending forces on the spindle. A predominantly vertical frame hinge axis also requires effort to move the front wheel assembly sideways about the first hinge through a wide angle of approximately 180 degrees yielding lengthy folding and unfolding times.

Some of the aforementioned problems may be overcome by eliminating the main frame hinge and providing a pivot means at the front fork to fold the front wheel. However, unless smaller wheels, a short main frame or both are used, the length of the folded bike is longer than with a main frame hinge.

Inclination of both front and rear wheels at angles relative to the bicycle longitudinal plane in the folded configuration overcomes long folded length and bending stress during use but contributes to an increased footprint width.

Avoiding interference between the front and rear assemblies as they fold may be accomplished by skewing transverse hinge axes in opposite directions from the longitudinal plane. However, due to the large-angle skew of the wheels to either side of the main frame the folded package has a large width.

An example bicycle in accordance with the present disclosure allows folding at two locations on a frame such that the folded arrangement has a compact volume with length about one-third of a full size bicycle and a width less than the combined width of the two wheels. Unlike existing folding bicycle frame designs with two folding points, the present examples folds both front and rear assemblies along predominantly vertical and parallel longitudinal planes toward a central frame portion. A simpler folding process is enabled, requiring less effort due to gravity assistance. Folding is more intuitive and more quickly executed than existing dual-frame hinge designs that require transverse as well as a longitudinal folds. Further, the frame hinges are biased into a closed position under the weight of the bicycle and a rider during normal use.

An example bicycle in accordance with the present disclosure may be quickly folded into a compact, package with a small footprint to thereby facilitate transport on trains, rapid transit systems, buses, or allow for storage in tight spaces. Manufacture may be achieved with standard parts and intuitive folding can be performed quickly with the aid of gravity. Unfolded, the bicycle has geometry and dimensions consistent with a full-sized, conventional bicycle allowing for normal riding.

It is to be understood that the figures provided are for illustrative purposes only and are not intended to limit the scope of the present disclosure.

Figure 1:
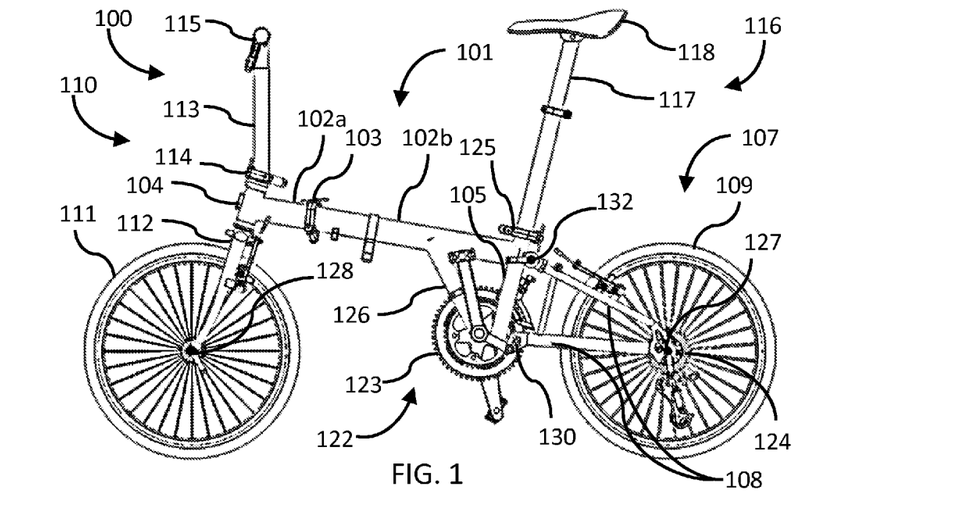
FIG. 1 illustrates a left side view of an example foldable bicycle in an expanded arrangement.
Figure 2:
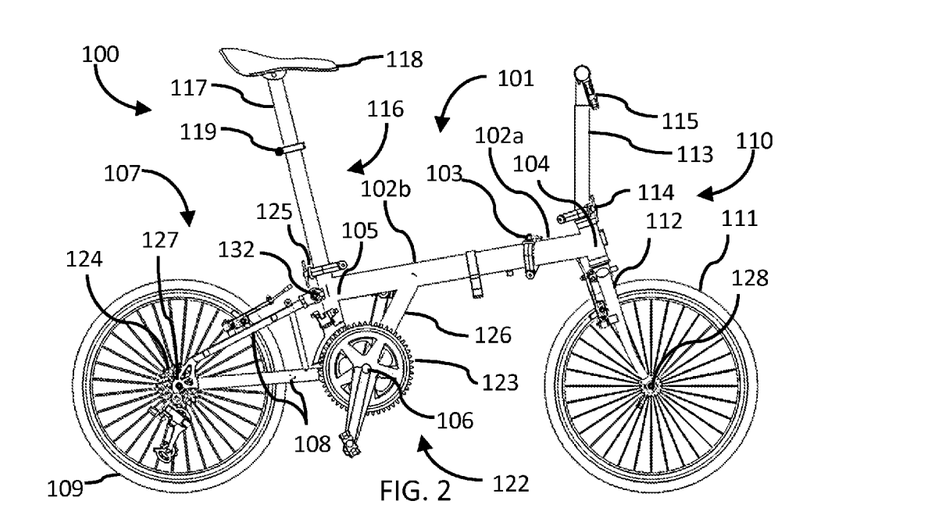
FIG. 2 illustrates a right side view of the example foldable bicycle of FIG. 1 in an expanded arrangement.

Schematic side elevations of an embodiment of a foldable vehicle in the form of a bicycle 100 are illustrated in FIGS. 1 & 2. A main frame assembly 101 comprises a main frame member including forward 102a and rearward 102b portions extending substantially from a head tube 104 at the front end to a seat tube 105 at the rear end. Head tube 104 is hollow and open at both ends to enable rotatable coupling with a steering tube (described below). Seat tube 105 extends downwardly between the rearward portion 102b of the main frame member and the rearward side of bottom bracket 106 and is configured to receive a seat post such as 117.

Main frame assembly 101 may be formed from any of a variety of materials and may take any of a variety of shapes, for example, main frame assembly 101 may be formed as a hollow metal or composite body. The main frame member may be generally straight and linear or may be slightly curved but is generally angled relative to a horizontal plane when resting upright on wheels 109 and 111 in the expanded arrangement.

A down tube 126 extends from a position proximal to the center of main frame member downwardly and rearwardly to bottom bracket 106 configured to carry crankset 123 which forms part of the bicycle's transmission assembly 122. Bicycle transmission assembly 122 includes crankset 123 rotatably mounted on the bottom bracket 106 and operatively coupled with rear gear sprockets 124 on rear wheel 109 by a chain or a belt (not shown).

A rear wheel assembly 107 is disposed at the rearward end of the main frame assembly 101 and includes a rear wheel 109 rotatably coupled to carrier 108 at a hub of wheel 109 by way of an axle 127. The circumference of rear wheel 109 defines a rear vertical longitudinal plane and rear wheel axle 127 defines a rear vertical transverse plane 400 orthogonal to the rear vertical longitudinal plane. Rear wheel carrier 108 may be formed from any of a variety of materials and take any of a variety of geometries, for example wheel carrier 108 may be formed as a hollow metal or composite body.

Steering assembly 110, disposed at the front end of main frame assembly 101, includes a front wheel 111, a fork 112 and a steering tube 113 for rotatable coupling to head tube 104. The circumference of front wheel 111 defines a front vertical longitudinal plane and front wheel axle 128 defines a front vertical transverse plane 500 orthogonal to the front vertical longitudinal plane.

Steering tube 113 includes a distal portion configured for receipt by the head tube 104 and a proximal portion including handlebar 115 which extends generally parallel with the front vertical transverse plane. Rotatable coupling with head tube 104 allows for rotation of steering assembly 110 about the longitudinal axis of head tube 104 to thereby change the angle of the front vertical longitudinal plane to steer bicycle 100.

Bicycle 100 is configured for conversion between an expanded arrangement in which longitudinal axes of the forward and rearward portions are generally coincident (FIGS. 1 & 2) and a folded arrangement in which the longitudinal axes are generally non-coincident (FIGS. 13-19). As illustrated by way of example in FIGS. 1 & 2, head tube 104 and seat tube 105 may be slightly rearwardly inclined relative to vertical in the expanded arrangement.

Figure 5:
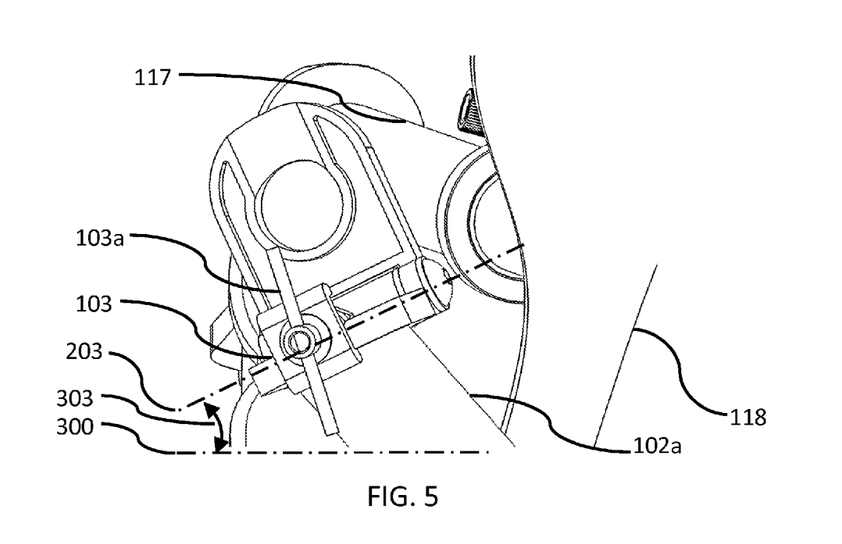
FIG. 5 illustrates a detail front view of an example main frame hinge of an example bicycle in the folded arrangement.

A hinge coupling 103 is provided on main frame member at a location between forward 102a and rearward 102b portions and enables relative pivoting therebetween about a main frame pivot axis 203 (FIG. 5). The main frame pivot axis 203 extends at an angle 303 relative to a horizontal plane 300 orthogonal to both the rear vertical longitudinal plane and the rear vertical transverse plane 400.

Figure 6:
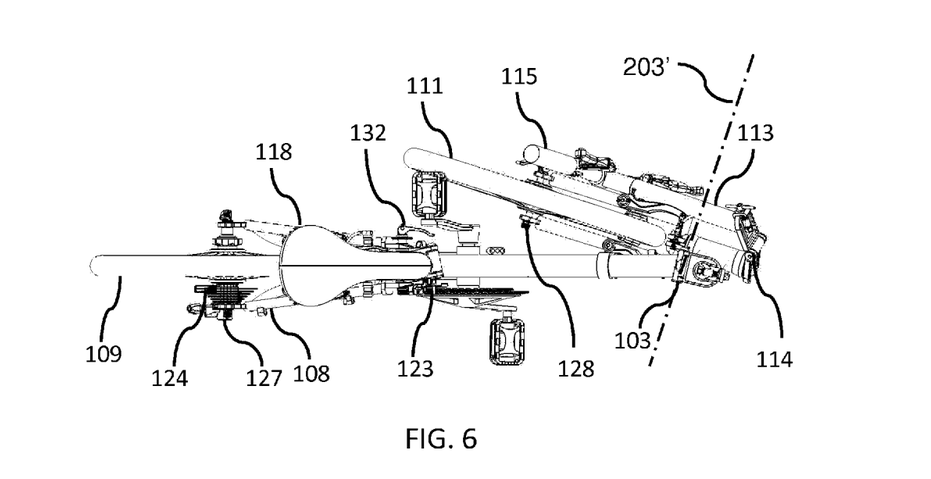
FIG. 6 illustrates a top view of an example bicycle having a main frame hinge angled relative to the vertical transverse plane only.

FIG. 6 illustrates a top view of an example bicycle having a main frame hinge axis 203' angled relative to the vertical transverse plane only. With pivot axis 203' angled relative to only the rear vertical plane 400, the front wheel assembly is skewed with a distal portion displaced away from the main frame and a proximal portion close to the main frame (FIG. 6). Subsequent folding of the rear wheel forward while the main frame and front wheel assembly are folded causes an interaction between the rear wheel assembly and the front wheel assembly.

Figure 7:
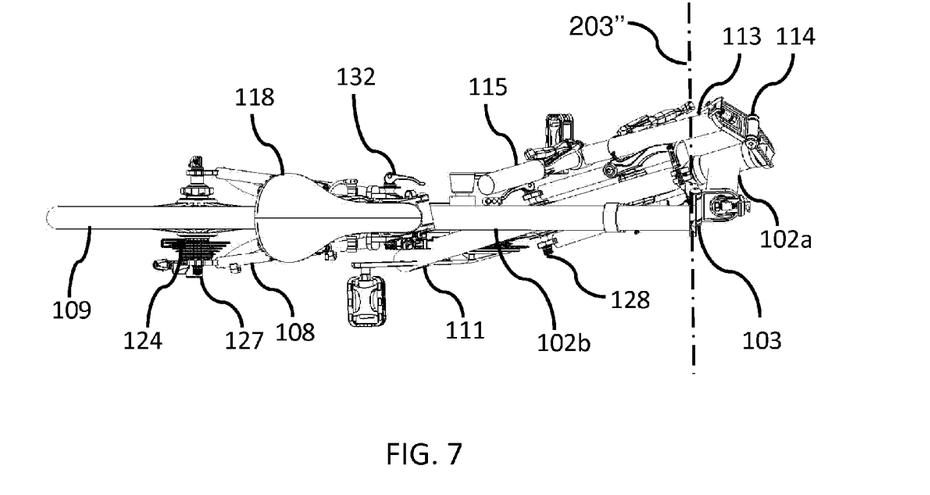
FIG. 7 illustrates a top view of an example bicycle having a main frame hinge angled relative to the horizontal plane only.

FIG. 7 illustrates a top view of an example bicycle having a main frame hinge axis 203" angled relative to the horizontal plane only. With pivot axis 203" angled relative to only the horizontal plane 300, the front wheel assembly is skewed with a proximal portion displaced away from the main frame and a distal portion close to the main frame (FIG. 7). Subsequent folding of the rear wheel forward while the main frame and front wheel assembly are folded also causes an interaction between the rear wheel assembly and the front wheel assembly.

Figure 8:
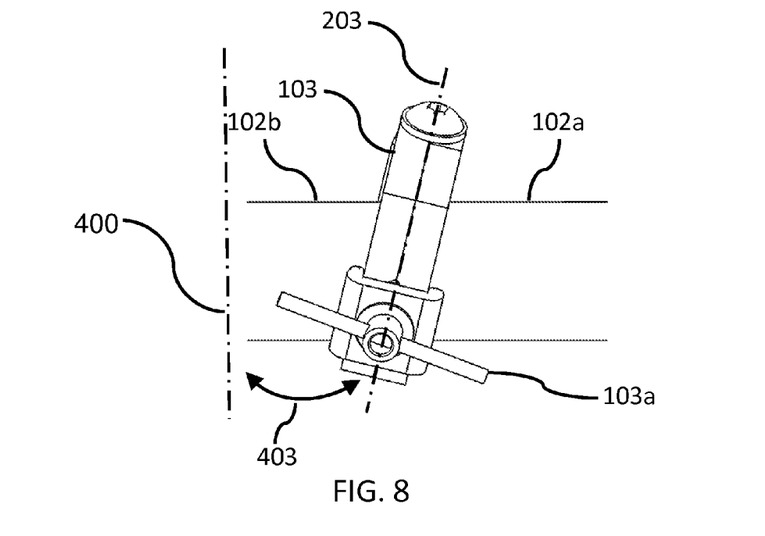
FIG. 8 illustrates a top detail view of an example main frame hinge of an example bicycle in the expanded arrangement.

To allow the front wheel assembly, to be pivoted to lie proximal and parallel to the main frame member without interaction with folded rear wheel assembly, pivot axis 203 is angled with respect to both the horizontal plane 300 (angle 303, FIG. 5) and the rear vertical transverse plane 400 (angle 403, FIG. 8). In this orientation of pivot axis 203, the main frame pivot axis midpoint lies generally below a center of the main frame member cross section.

In some embodiments, angles 303 and 403 may be acute, for example, angle 303 may be approximately 25 degrees, while angle 403 may be approximately 15 degrees. Angles different from these may be appropriate depending on width dimensions of various parts of the bicycle and its specific geometry. Front portion of bicycle 100 including head tube 104 and steering assembly 110 is capable of pivoting about main frame pivot axis 203 through approximately 90 degrees to its folded position with relative pivoting of the forward 102a and rearward 102b portions of the main frame member.

With reference to FIG. 8, main frame pivot axis 203 is inclined towards the forward portion of the bicycle and towards the left side of the bicycle. However, in some examples, main frame pivot axis 203 may be inclined toward the forward portion of bicycle 100 and towards the right side.

Figure 15:
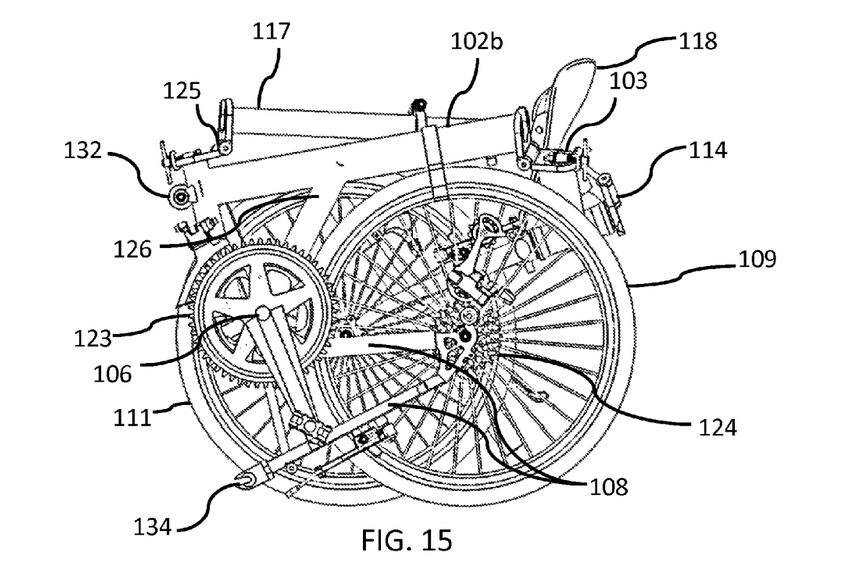
FIG. 15 illustrates a right side view of the example foldable bicycle of FIGS. 1-5, 7 & 9-14 with the steering tube pivoted downward, the main frame member forward portion pivoted downward, the rear wheel assembly pivoted forward and a seat post pivoted forward.
Figure 16:
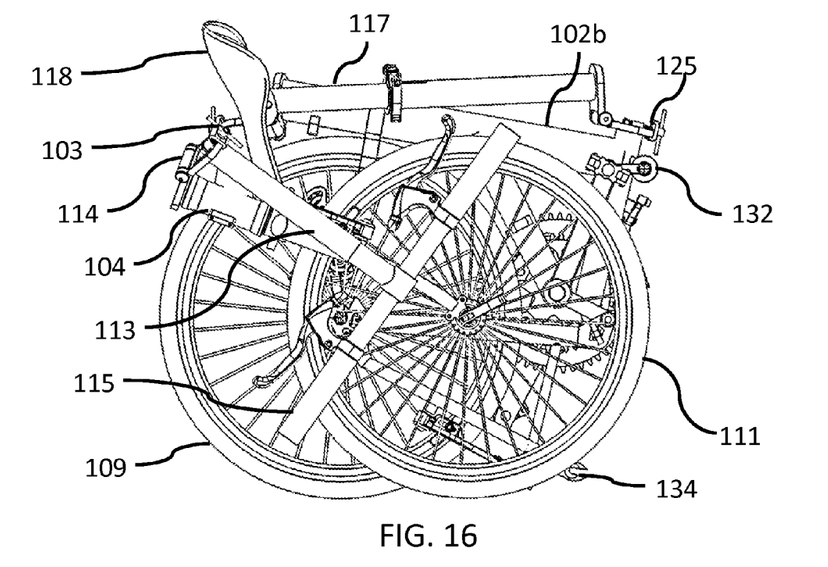
FIG. 16 illustrates a left side view of the example foldable bicycle of FIGS. 1-5, 7 & 9-15 in a completely folded arrangement.

According to this disposition of main frame pivot axis 203, in the expanded arrangement (FIGS. 1 & 2), front wheel 111 is disposed forwardly of the main frame member and lies substantially in the rear vertical longitudinal plane while, in the folded arrangement (FIGS. 15-19), front wheel 111 is disposed to one side of rear wheel carrier 108 in a plane parallel to the rear vertical longitudinal plane. Furthermore, in the folded arrangement forward portion 102a extends at an angle oblique to both the rear vertical longitudinal and rear vertical transverse planes (FIG. 16).

In some embodiments, a locking means 103a (FIGS. 5 & 7) may be provided for locking main frame hinge 103 in the expanded arrangement, in the folded arrangement or either of these. In the expanded arrangement, with hinge 103 locked, pivoting will be prevented and the combined effect of the weight of bicycle 100 and a rider will reinforce maintaining hinge 103 in a closed position as if the main frame member were rigid.

A rear wheel assembly hinge 130 is configured to allow rear wheel assembly 107 to pivot relative to the main frame member in a vertical plane coincident with the rear vertical longitudinal plane.

Figure 9:
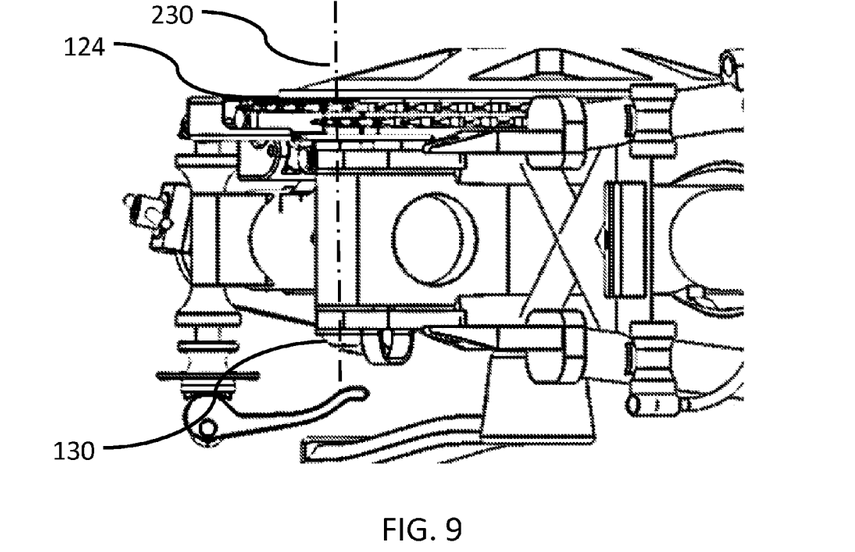
FIG. 9 illustrates a bottom detail view of an example rear wheel assembly hinge of an example bicycle in the folded arrangement.
Figure 10:
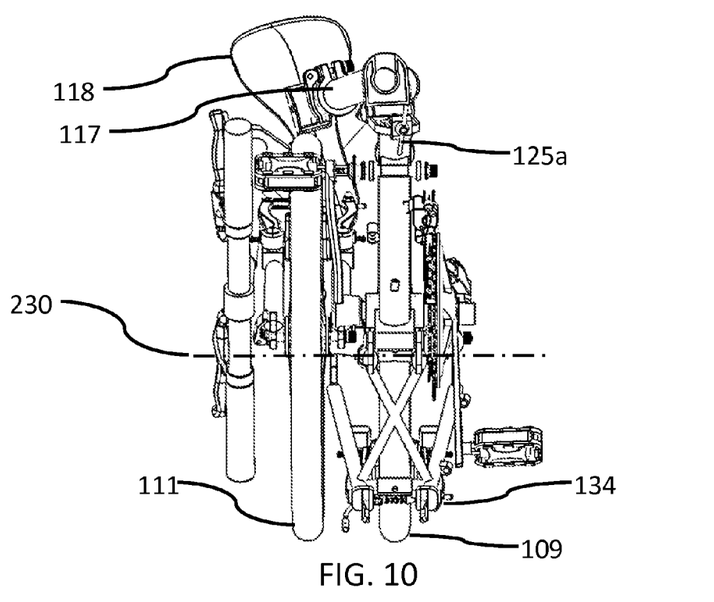
FIG. 10 illustrates a rear detail view of an example rear wheel assembly hinge of an example foldable bicycle.

Wheel carrier 108 is connected by a rear assembly hinge 130 (FIG. 1) to main frame assembly 101 at a pivot end, proximal to the lower end of the seat tube 105. Rear assembly hinge 130 allows rear wheel assembly 107 to pivot about a hinge axis 230. With reference to FIGS. 9 & 10, hinge axis 230 may be parallel to both horizontal plane 300 as well as to rear vertical transverse plane 400.

Wheel carrier 108 is detachably coupled by a seat stays clamp 132 to the central frame assembly 101 proximal to the upper end of the seat tube 105. Unfastening seat stays clamp 132 disengages the rear frame latch 134 and allows rear wheel assembly 107 to be pivoted between an operative expanded, riding position disposed at the rearward end of the bicycle and a compact folded position under main frame assembly 101. The motion of any point on the rear wheel assembly 107 about hinge axis 230 of rear assembly hinge 130 (at the pivot end) lies in a plane which is substantially coincident with the vertical longitudinal plane of the bicycle in its operative riding position. The vertical pivot plane being parallel to the bicycle longitudinal plane effectively causes rear wheel 109 to move to a position underneath the main frame member as it is pivoted through approximately 180 degrees from the expanded arrangement to the folded arrangement. The angle of the hinge axis 230 and the angular pivot range of rear wheel assembly 107 may differ from the aforesaid, depending on the width dimensions of the various parts of the bicycle and its specific geometry.

Figure 11:
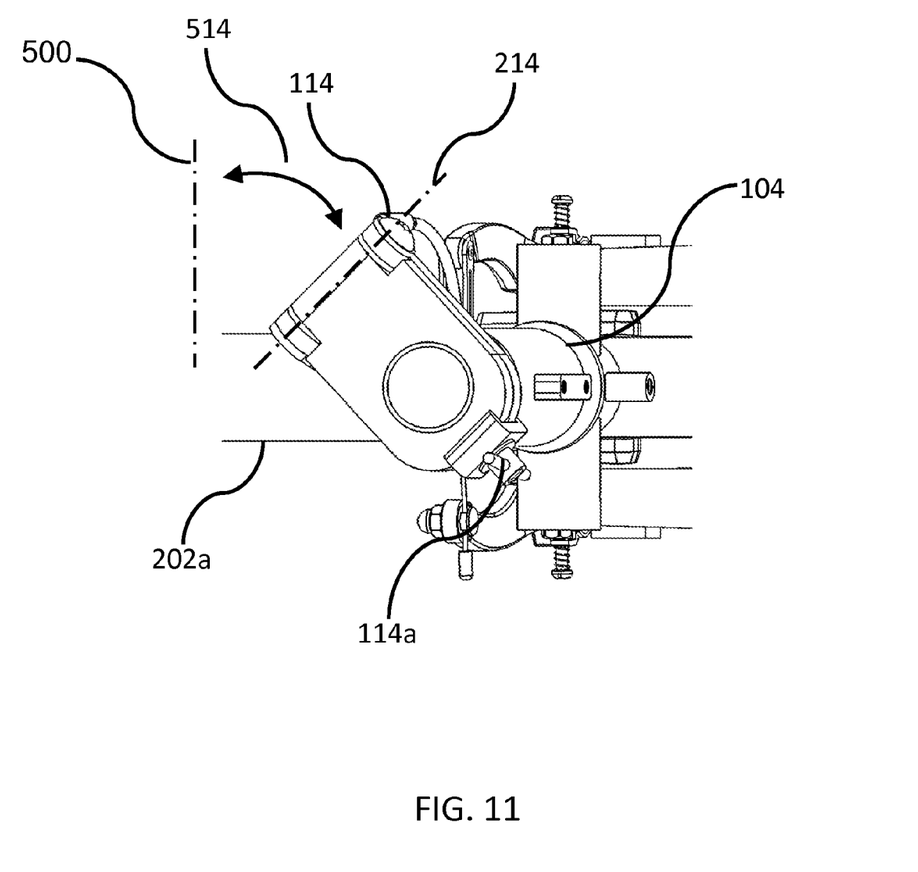
FIG. 11 illustrates a top detail view of an example steering tube hinge of an example foldable bicycle.

Steering tube 113 is further provided with a steering tube hinge 114 to enable pivoting of the proximal portion of steering tube 113 and handlebar 115 relative to head tube 104 as well as pivoting of distal portion of steering tube 113 about a steering tube pivot axis 214. Steering tube pivot axis 214 extends at an angle 514 relative to front vertical transverse plane 500 (FIG. 11) and is substantially perpendicular to the head tube longitudinal axis. In some embodiments, steering tube pivot axis 214 may extend at example angles of 90, 85, 80 or 75 degrees relative to the head tube longitudinal axis.

In some embodiments, angle 514 may be approximately 45 degrees. However, greater or lesser angles of inclination of pivot axis 214 may be appropriate depending on the width dimensions of the various parts of the bicycle and their particular geometry.

Complete folding of steering tube 113 positions its proximal portion parallel to and closely spaced from fork 112, while handlebar 115 lies alongside front wheel 111 at an angle substantially perpendicular to fork 112 (FIGS. 12-19). In some embodiments, handlebar 115 may extend at example angles of 90, 85, 80 or 75 degrees relative to fork 112 when in the folded arrangement.

Furthermore, the folded steering tube 113 and handlebar 115 lie in a plane approximately parallel with the front vertical longitudinal plane of the front wheel 111.

Figure 14:
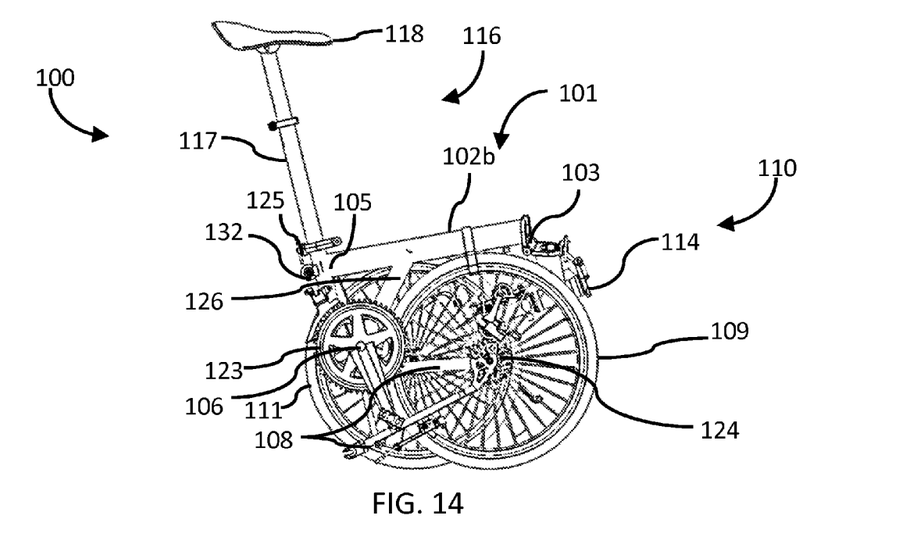
FIG. 14 illustrates a right side view of the example foldable bicycle of FIGS. 1-5, 7 & 9-13 with the steering tube pivoted downward, the main frame member forward portion pivoted downward, and a rear wheel assembly pivoted forward.

During transition between expanded and folded arrangements, head tube 104 and steering assembly 110 are pivoted about main frame pivot axis 203 using hinge 103, and steering assembly 110 remains free to rotate relative to head tube 104. Thus, by turning steering tube 113 slightly about the head tube axis when steering assembly 110 is in the folded arrangement, front wheel 111 may be oriented parallel to and spaced-apart from rear wheel carrier 108 so as to partially overlap rear wheel 109 when viewed in profile (FIGS. 14-16). Angular range of travel of steering assembly 110 between expanded and folded arrangements may also depend on the particular dimensions and geometry of the bicycle. A locking means 114a (FIG. 11) may be provided for securing steering tube hinge 114 against pivoting while in the operative, expanded riding arrangement.

Bicycle 100 includes a seat assembly 116 with a seat post 117 configured to hold a seat 118 at a top end. Seat post 117 is slidably engageable within seat tube 105 of the main frame member and capable of extension or retraction relative thereto thus enabling comfortable positioning for a rider in the expanded arrangement as well as reduced dimensions in the folded arrangement.

Seat post 117 may be selectively secured at any of a variety of positions within seat tube 105 by a fastening mechanism 119. Suitable fastening mechanisms 119 may include but are not limited to clamps such as a quick-release clamp. With bicycle 100 in the expanded, riding arrangement, seat post 117 is partially inserted into seat tube 105 and secured by fastening mechanism 119.

Figure 3:
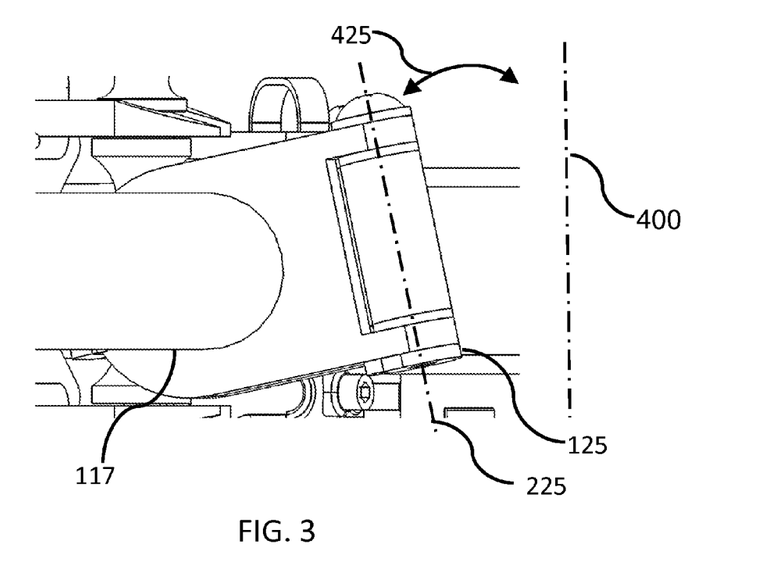
FIG. 3 illustrates a top detail view of an example seat tube hinge of an example foldable bicycle.
Figure 4:
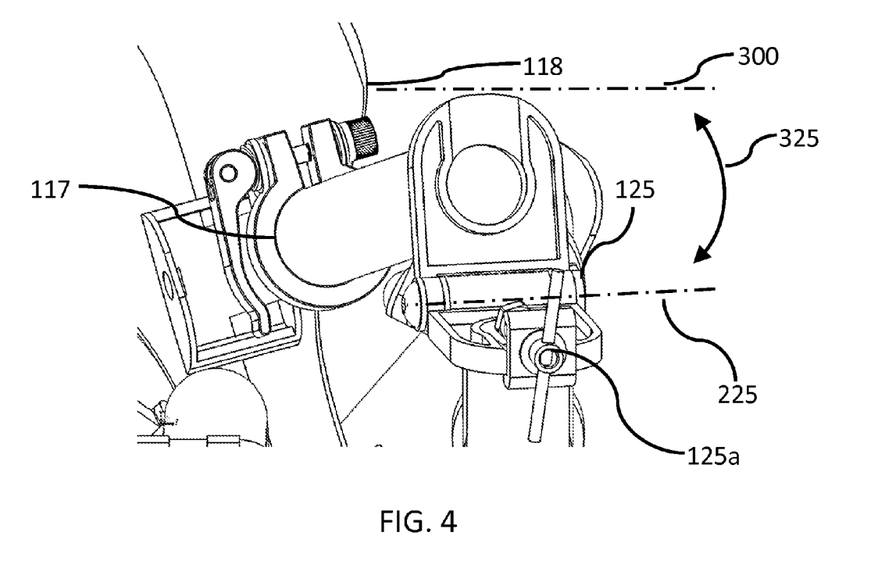
FIG. 4 illustrates a rear detail view of an example seat tube hinge of an example foldable bicycle.

A seat tube hinge 125 is provided at a lower portion of seat tube 105 near main frame member. Seat tube hinge 125 enables pivoting of seat post 117 and seat 118 forward and downwards towards steering assembly 110 and the main frame member about a pivot axis 225 (FIGS. 3 & 4). Pivot axis 225 extends at a first acute angle 425 relative to rear vertical transverse plane 400 and at a second acute angle 325 relative to horizontal plane 300.

When the bicycle is in the expanded arrangement (FIGS. 1 & 2), the seat tube 117 is generally aligned with the rear vertical longitudinal plane and generally aligned with an oblique plane when the bicycle is in the folded arrangement, with the seat proximal to the forward portion of the main frame member.

With main frame hinge 103 unlocked, applying a force to the main frame member near main frame pivot axis 203 in a direction towards a surface of the main frame member generally opposite hinge 103 promotes conversion from the expanded arrangement (FIGS. 1 & 2) to the folded arrangement (FIGS. 15-19). As such, lifting the main frame member from a supporting surface in a generally vertical direction, will cause steering assembly 110 to begin pivoting substantially downwardly about hinge 103 with the assistance of gravity.

Figure 17:
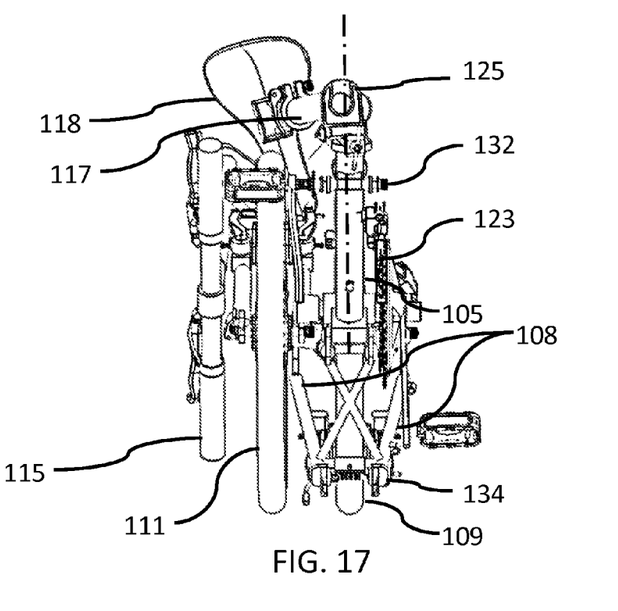
FIG. 17 illustrates a rear view of the example foldable bicycle of FIGS. 1-5, 7 & 9-16 in a completely folded arrangement.
Figure 18:
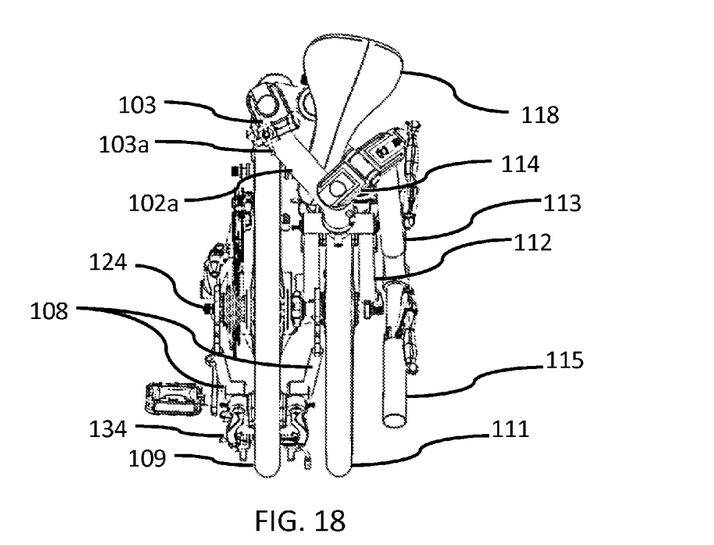
FIG. 18 illustrates a front view of the example foldable bicycle of FIGS. 1-5, 7 & 9-17 in a completely folded arrangement.
Figure 19:
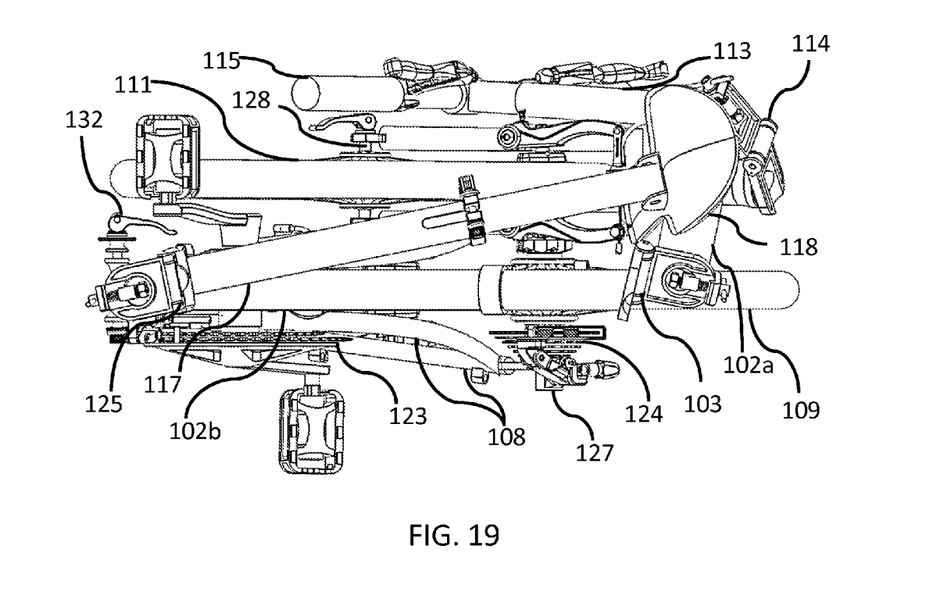
FIG. 19 illustrates a top view of the example foldable bicycle of FIGS. 1-5, 7 & 9-18 in a completely folded arrangement.

Generally, when bicycle 100 is in the folded arrangement, main frame forward portion 102a extends at an oblique angle with respect to the rear vertical longitudinal plane (FIG. 18); the front vertical longitudinal plane lies between the rear vertical longitudinal plane and the steering tube 113 (FIGS. 17-19); and the front and rear vertical longitudinal planes are spaced apart and approximately parallel (FIGS. 17-19). Thus, front wheel 111 lies substantially alongside or adjacent rear wheel carrier 108 and overlaps rear wheel 109 (FIGS. 14-16).

As an additional characteristic when bicycle 100 is in the folded arrangement, the front vertical transverse plane 500 is spaced apart from the rear vertical transverse plane 400 such that axes 127 and 128 are offset (FIGS. 14-16 & 19). By offsetting wheel axes 127 and 128 while keeping the front vertical longitudinal plane parallel to rear vertical longitudinal plane, the front vertical longitudinal plane and the rear vertical longitudinal plane are spaced apart by a distance not greater than the sum of one-half of the length of the front wheel axle and one-half of the length of the rear wheel axle. Thus, front wheel 111 may be positioned close to rear wheel assembly 107 offering a relatively small width dimension in the folded arrangement.

Figure 12:
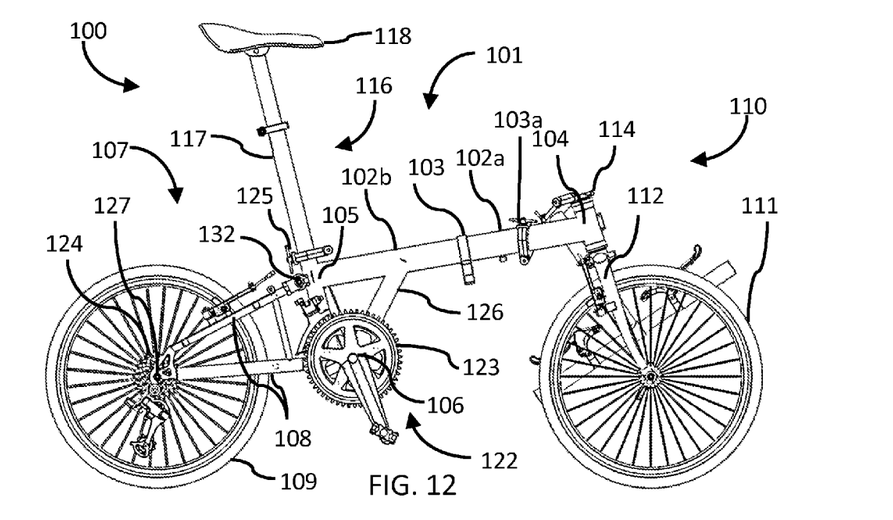
FIG. 12 illustrates a right side view of the example foldable bicycle of FIGS. 1-5, 7 & 9-11 with a steering tube pivoted downward.
Figure 13:
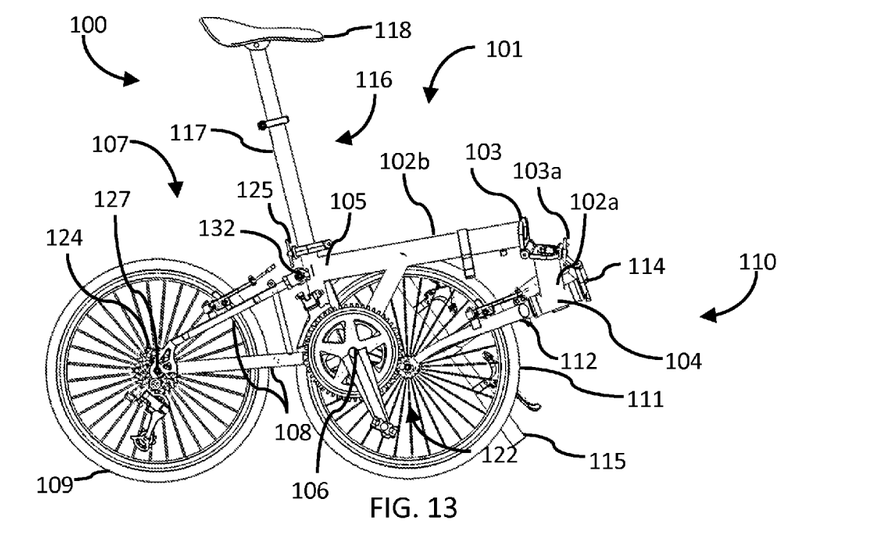
FIG. 13 illustrates a right side view of the example foldable bicycle of FIGS. 1-5, 7 & 9-12 with the steering tube pivoted downward and a main frame member forward portion pivoted downward.

According to a method for configuring an example vehicle between an expanded arrangement and a folded arrangement, a user may unfasten a quick release clamp 114a of steering tube hinge 114 and handlebar 115 may be folded down to lie alongside fork 112 and front wheel 111 (FIG. 12). Steering tube 113 is configured such that the longitudinal axis of its proximal portion lies within a plane parallel to and spaced apart from the front vertical longitudinal plane while its distal portion lies within the vertical longitudinal plane. With steering assembly 110 in the folded arrangement, hinge 114 may be re-secured.

With steering assembly 110 in the folded arrangement, main frame hinge 103 may be unfastened using locking means 103a and elongate main frame member is configured such that longitudinal axes of its forward 102a and rearward 102b portions are non-coincidental. As such, the longitudinal axis of forward end 102a extends in an oblique plane while the longitudinal axis of rearward end 102b extends within the rear vertical longitudinal plane. The user may arrive at this configuration by lifting the main frame member up and, with the aid of gravity, swinging front wheel 111 downwardly and then rearwardly (FIG. 11) by approximately 90 degrees.

At the same time, with the aid of gravity, rear wheel assembly 107 may be pivoted about hinge 130 in a vertical plane coincident with the rear vertical longitudinal plane, swinging downwardly and then forwardly by approximately 180 degrees into a position directly underneath main frame rearward portion 102b (FIG. 14). In this configuration the front wheel 111 almost fully overlaps wheel carrier 108. Front wheel 111 is configured such that the longitudinal vertical plane lies within a plane approximately parallel to and spaced apart from the rear longitudinal vertical plane and between the rear longitudinal vertical plane and the plane of the steering tube proximal portion. This may be accomplished by slightly rotating front wheel 111.

A user may unfasten a quick release clamp 125a and pivot seat post 117 forward about axis 225 in a plane oblique to the rear vertical longitudinal and rear vertical transverse planes and into a position in which a nose of seat 118 is alongside main frame rearward portion 102a, and between respective front and rear wheel vertical longitudinal planes. Locking means 125a may be refastened to secure seat post 117 in the folded position (FIGS. 13-17).

When the bicycle is in the expanded arrangement, seat tube 117 is generally aligned with the rear vertical longitudinal plane and generally aligned with an oblique plane when the bicycle is in the folded arrangement.

The bicycle may then be secured in the folded arrangement. The folded bicycle may be parked in an upright position, supported by the front 111 and rear wheels 109 and the rear frame latch 134.

Return of the bicycle to the expanded arrangement may be achieved by reversing the folding action and re-securing all hinges and fastening or locking means.

It will be appreciated that while generally described within the context of a bicycle, a foldable vehicle in accordance with the disclosure is not limited to a bicycle but may include other vehicles of both non-motorized and motorized varieties including but not limited to scooters, electric bicycles and motorcycles.

While the disclosure has been presented with respect to certain specific embodiments, it will be appreciated that many modifications and changes may be made by those skilled in the art without departing from the spirit and scope of the invention. It is intended, therefore, by the appended claims to cover all such modifications and changes as fall within the true spirit and scope of the invention.

What is claimed is:

1. A vehicle configured for conversion between expanded and folded arrangements, comprising:
    a front wheel having a circumference defining a front vertical longitudinal plane and an axle defining a front vertical transverse plane orthogonal to the front vertical longitudinal plane;
    a rear wheel assembly including a rear wheel having a circumference defining a rear vertical longitudinal plane and an axle defining a rear vertical transverse plane orthogonal to the rear vertical longitudinal plane;
    a main frame member having forward and rearward portions extending between the front wheel and the rear wheel and including, for receiving a steering tube, a head tube formed at a distal end of the forward portion and, for receiving a seat post, a seat tube formed at a distal end of the rearward portion;
    a hinge coupling enabling relative pivoting of the forward and rearward portions about a main frame pivot axis extending at an acute angle relative to the rear vertical transverse plane and at an acute angle relative to a horizontal plane orthogonal to both the rear vertical longitudinal and rear vertical transverse planes; and
    a rear wheel assembly hinge configured to allow the rear wheel assembly to pivot relative to the main frame member within a vertical plane coincident with the rear vertical longitudinal plane;

wherein the front vertical longitudinal plane and the rear vertical longitudinal plane are spaced apart and approximately parallel, in the folded arrangement.

2. The vehicle as set forth in claim 1, wherein the seat tube is generally aligned with the rear vertical longitudinal plane when the vehicle is in the expanded arrangement and generally aligned with an oblique plane when the vehicle is in the folded arrangement.

3. The vehicle as set forth in claim 1, wherein when the vehicle is in the folded arrangement, respective front and rear wheel axles are spaced apart and approximately parallel.

4. The vehicle as set forth in claim 3, wherein when the vehicle is in the folded arrangement, the respective front and rear wheel axles lie within a plane parallel with the horizontal plane orthogonal to both the rear vertical longitudinal and rear vertical transverse planes.

5. The vehicle as set forth in claim 1, further comprising a steering tube including a distal portion configured for receipt by the head tube, a proximal portion including handlebar extending generally parallel with the front vertical transverse plane and a steering hinge enabling relative pivoting of the proximal and distal portions about a steering tube pivot axis extending at an acute angle relative to the front vertical transverse plane.

6. The vehicle as set forth in claim 5, wherein when the vehicle is in the folded arrangement, the front vertical longitudinal plane lies between the rear vertical longitudinal plane and the steering tube.

7. The vehicle as set forth in claim 5, wherein the steering tube pivot axis extends at an angle of approximately 45 degrees to the front vertical longitudinal plane.

8. The vehicle as set forth in claim 5, wherein, the front wheel is rotatably held by a front fork; and wherein, in the folded arrangement, the steering tube proximal portion is positioned parallel to and closely spaced from the front fork, and the handlebar lies adjacent the front wheel at an angle substantially perpendicular to the front fork.

9. The vehicle as set forth in claim 5, wherein, in the folded arrangement, the steering tube and the handlebar lie in a plane approximately parallel with the front vertical longitudinal plane of the front wheel.

10. The vehicle as set forth in claim 1, wherein the rear wheel assembly is configured to pivot between a position at a rearward end of the bicycle and a position under the main frame member.

11. The vehicle as set forth in claim 1, wherein, applying a force to the main frame member near the main frame pivot axis in a direction towards a surface of the main frame member generally opposite the hinge coupling promotes conversion from the expanded arrangement to the folded arrangement.

12. The vehicle as set forth in claim 1, wherein, with the vehicle in the expanded arrangement, lifting up a rear portion of the main frame allows gravity to promote conversion from the expanded arrangement to the folded arrangement.

13. The vehicle as set forth in claim 1, wherein, in the folded arrangement, the forward portion of main frame member extends at an oblique angle with respect to the rear vertical longitudinal plane.

14. The vehicle as set forth in claim 1, wherein, in the folded arrangement, the forward portion of main frame member extends at an oblique angle with respect to the rear vertical transverse plane.

15. The vehicle as set forth in claim 1, wherein the main frame pivot axis is inclined towards the forward portion of the vehicle and towards the left side of the vehicle.

16. The vehicle as set forth in claim 1, wherein the main frame pivot axis is inclined towards the forward portion of the vehicle and towards the right side of the vehicle.

17. The vehicle as set forth in claim 1, wherein, in the expanded arrangement, the main frame member longitudinal axis lies within the rear vertical longitudinal plane.

18. The vehicle as set forth in claim 1, wherein, in the folded arrangement, a seat positioned on the seat tube is proximal to the forward portion of the main frame member.

19. The vehicle as set forth in claim 1, wherein, in the folded arrangement, the front wheel lies substantially adjacent to the rear wheel assembly and overlaps the rear wheel.

20. The vehicle as set forth in claim 1, wherein, with relative pivoting of the forward and rearward portions of the main frame member, the head tube and steering assembly are configured to pivot about the main frame pivot axis through approximately 90 degrees to the folded arrangement.

* * * * *